(12) United States Patent
Amano

(10) Patent No.: US 9,122,045 B2
(45) Date of Patent: Sep. 1, 2015

(54) PROJECTION ZOOM LENS AND PROJECTION TYPE DISPLAY DEVICE

(71) Applicant: FUJIFILM Corporation, Tokyo (JP)

(72) Inventor: Masaru Amano, Saitama-ken (JP)

(73) Assignee: FUJIFILM CORPORATION, Tokyo (JP)

( * ) Notice: Subject to any disclaimer, the term of this patent is extended or adjusted under 35 U.S.C. 154(b) by 0 days.

(21) Appl. No.: 14/280,912

(22) Filed: May 19, 2014

(65) Prior Publication Data

US 2014/0254027 A1 Sep. 11, 2014

Related U.S. Application Data

(63) Continuation of application No. PCT/JP2012/007234, filed on Nov. 12, 2012.

(30) Foreign Application Priority Data

Nov. 22, 2011 (JP) .................................. 2011-254547

(51) Int. Cl.
*G02B 15/177* (2006.01)
*G02B 13/18* (2006.01)
*G02B 13/22* (2006.01)
*G03B 33/12* (2006.01)

(52) U.S. Cl.
CPC .............. *G02B 15/177* (2013.01); *G02B 13/18* (2013.01); *G02B 13/22* (2013.01); *G03B 33/12* (2013.01)

(58) Field of Classification Search
CPC .............................. G02B 15/177; G02B 15/24
See application file for complete search history.

(56) References Cited

U.S. PATENT DOCUMENTS

| 7,545,578 | B2 | 6/2009 | Sugita | |
|---|---|---|---|---|
| 2007/0195427 | A1* | 8/2007 | Sugita | 359/692 |
| 2007/0285802 | A1 | 12/2007 | Sugita | |
| 2009/0135497 | A1* | 5/2009 | Nagahara et al. | 359/682 |
| 2009/0219624 | A1 | 9/2009 | Yamamoto et al. | |
| 2011/0080565 | A1 | 4/2011 | Sugawara et al. | |

FOREIGN PATENT DOCUMENTS

| JP | 2005-156804 | 6/2005 |
|---|---|---|
| JP | 2005-156805 | 6/2005 |
| JP | 2006-184723 | 7/2006 |
| JP | 2007-328163 | 12/2007 |

(Continued)

OTHER PUBLICATIONS

International Search Report, PCT/JP2012/007234, Jan. 29, 2013.

*Primary Examiner* — Jordan Schwartz
(74) *Attorney, Agent, or Firm* — Young & Thompson

(57) ABSTRACT

The projection zoom lens substantially consists of a first lens group having negative refractive power, a second lens groups through a fourth lens group all having positive refractive power, a fifth lens group having positive or negative refractive power, and a sixth lens group having positive refractive power, arranged in this order from the magnification side; wherein the reduction side is telecentric. Further, the first lens group and the sixth lens group are fixed and the second lens group through the fifth lens group move along the optical axis while changing magnification. The fourth lens group substantially consists of only one positive meniscus lens with a concave surface toward the reduction side. The projection zoom lens satisfies conditional expression (1) below:

$$1.2 < f3/f4 < 10.0 \qquad (1),$$

where
f3 is the focal length of the third lens group, and f4 is the focal length of the fourth lens group.

11 Claims, 11 Drawing Sheets

(56) References Cited

FOREIGN PATENT DOCUMENTS

| | | |
|---|---|---|
| JP | 2008-242402 | 10/2008 |
| JP | 2009-210594 | 9/2009 |
| JP | 2009-258185 | 11/2009 |
| JP | 2011-076040 | 4/2011 |

* cited by examiner

FIG.1
EXAMPLE 1
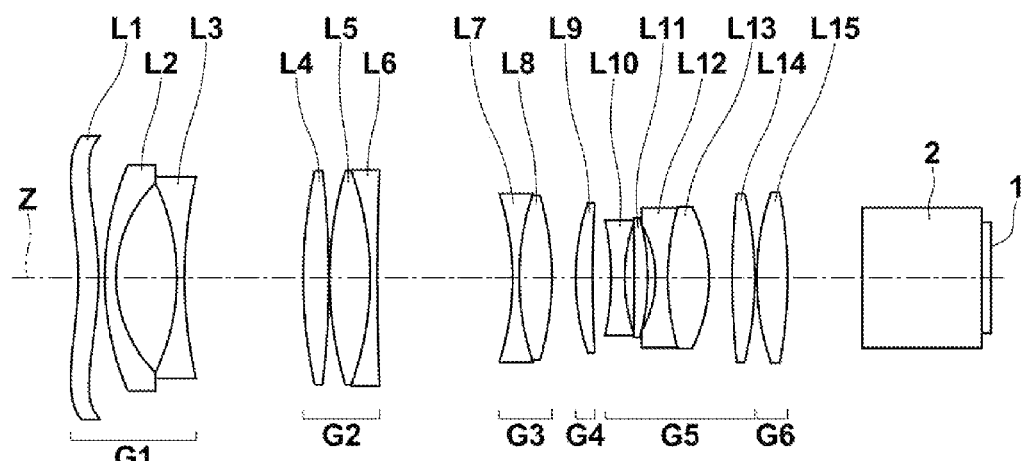
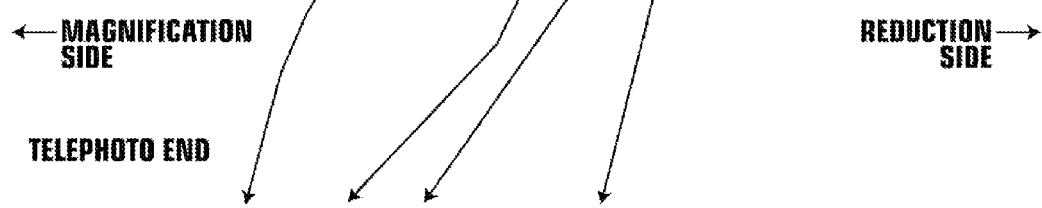
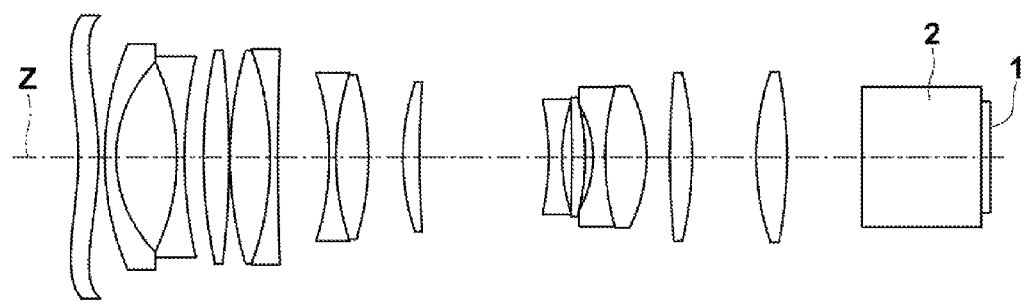

FIG.2
EXAMPLE 2
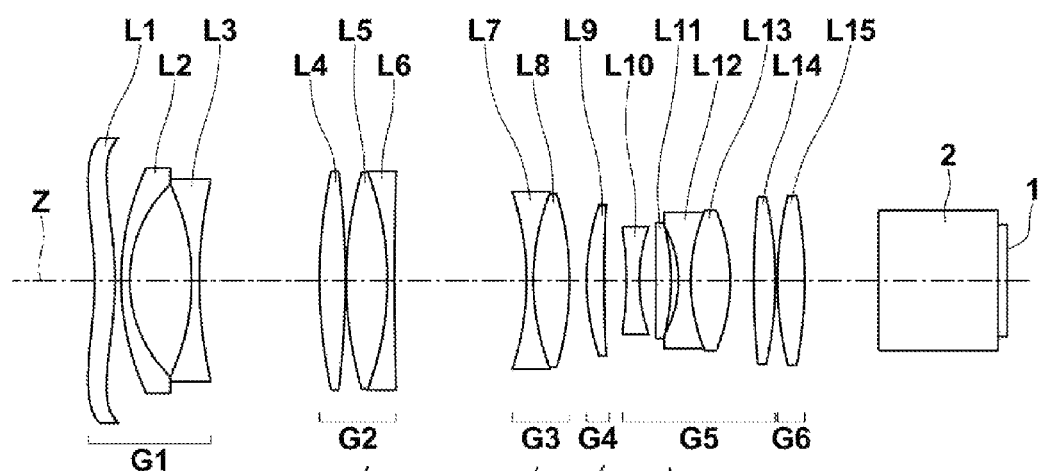
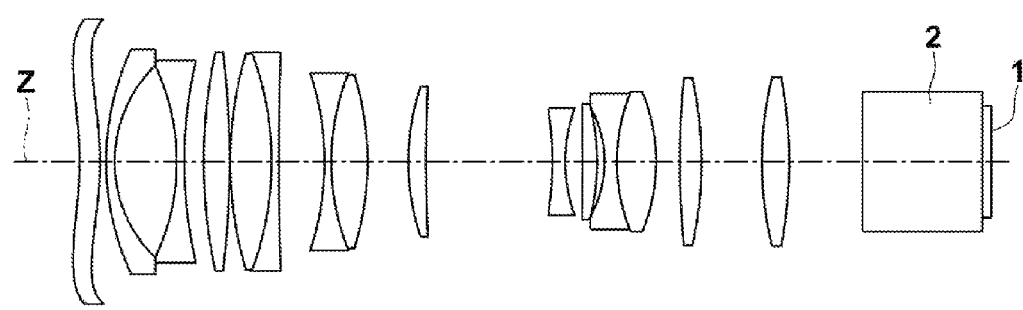

FIG.3
EXAMPLE 3
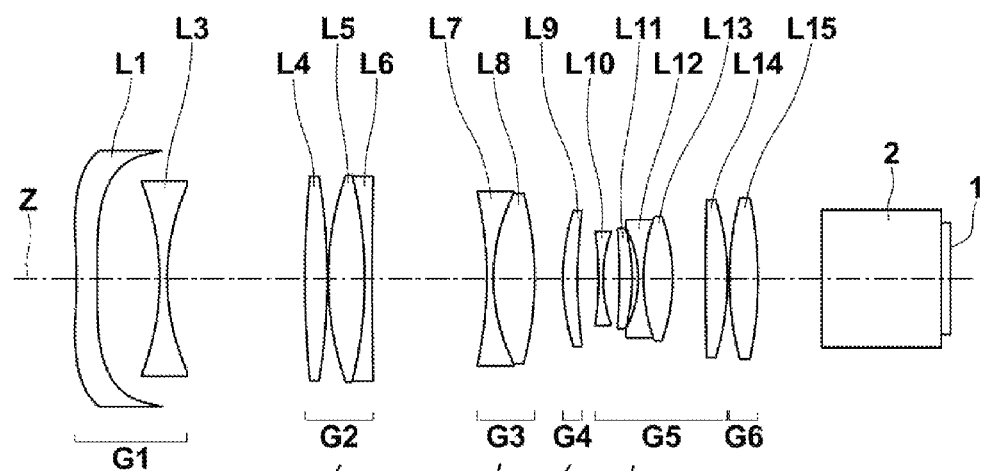
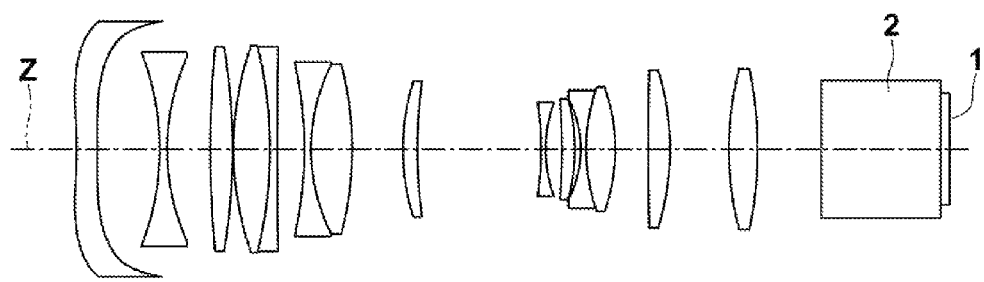

FIG.4
EXAMPLE 4
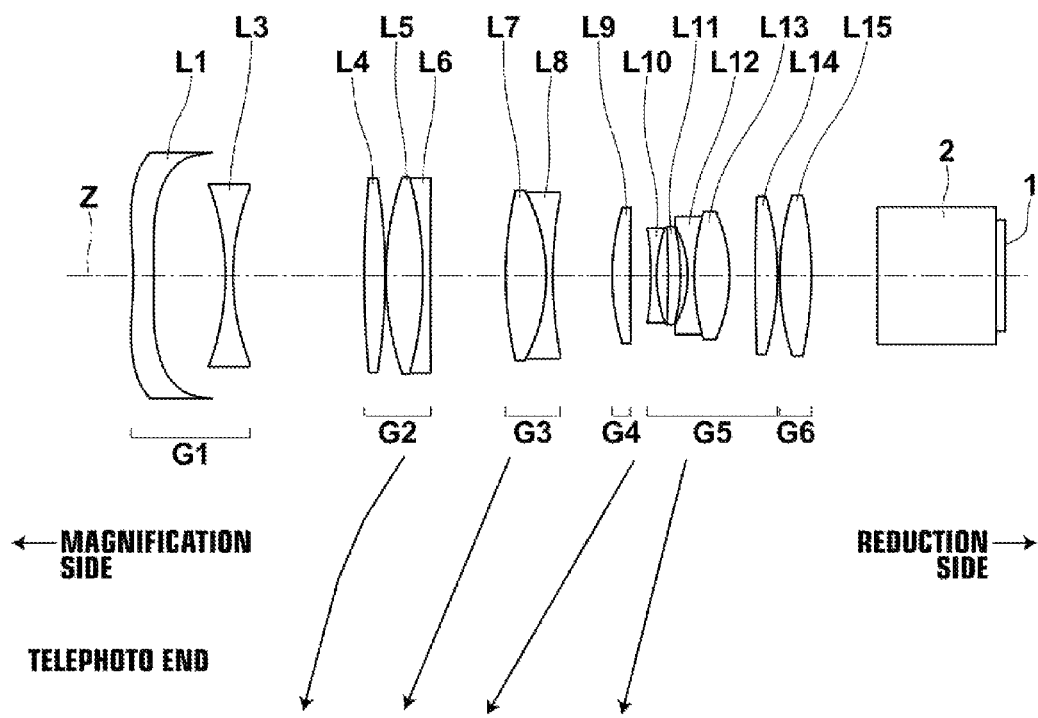
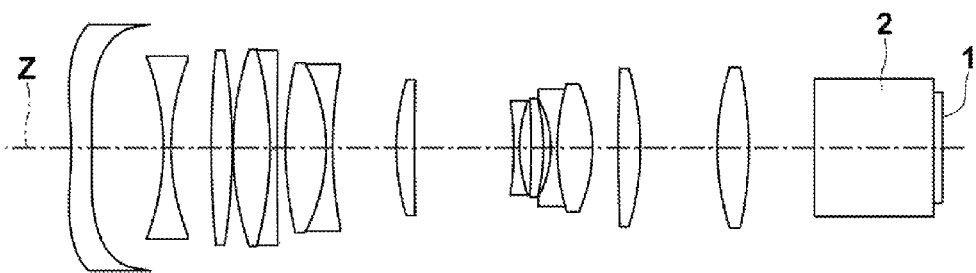

FIG.5
EXAMPLE 1
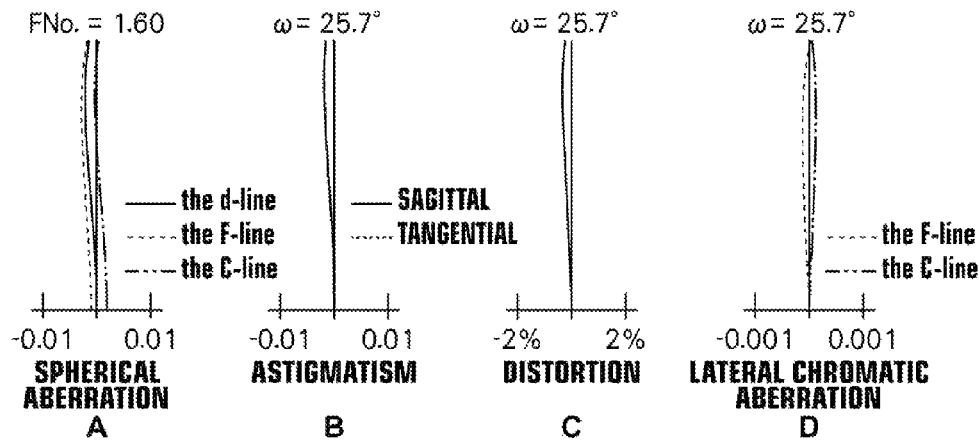
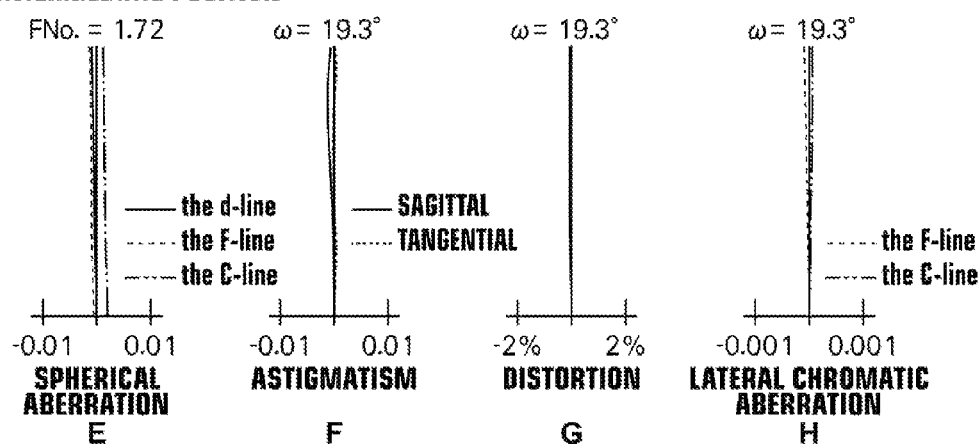
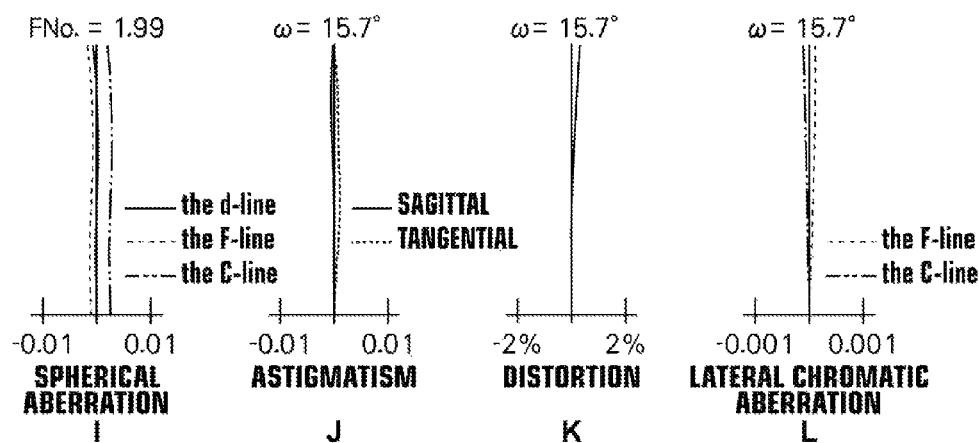

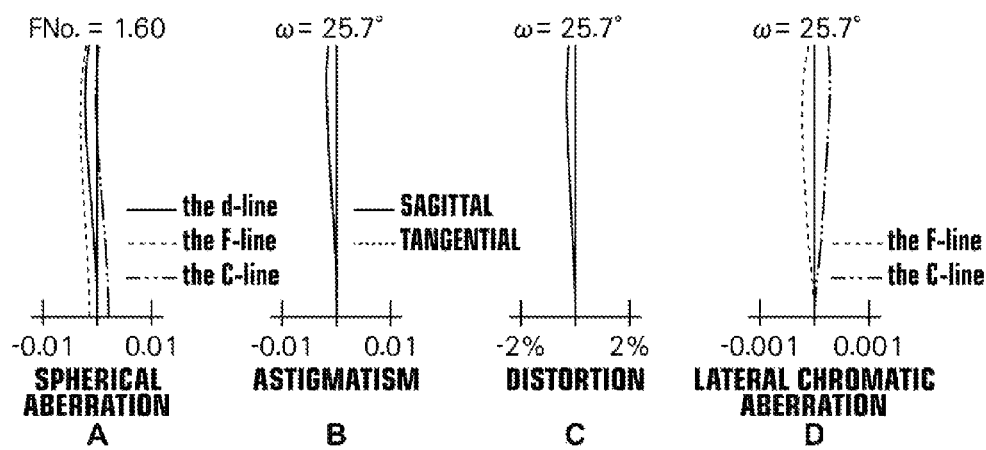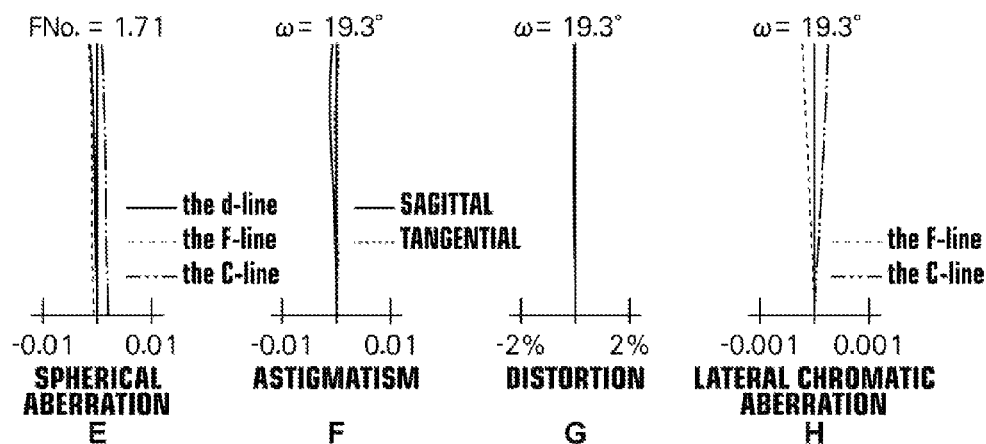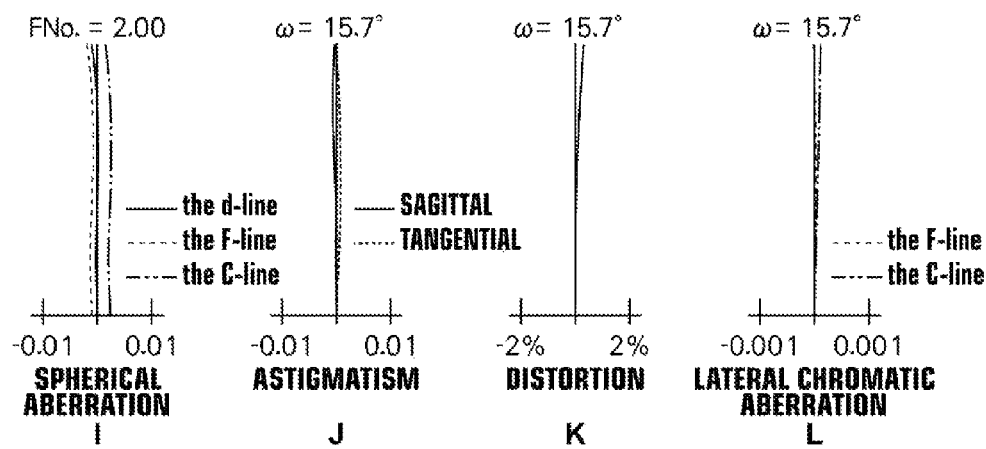
FIG.6 EXAMPLE 2

FIG.7
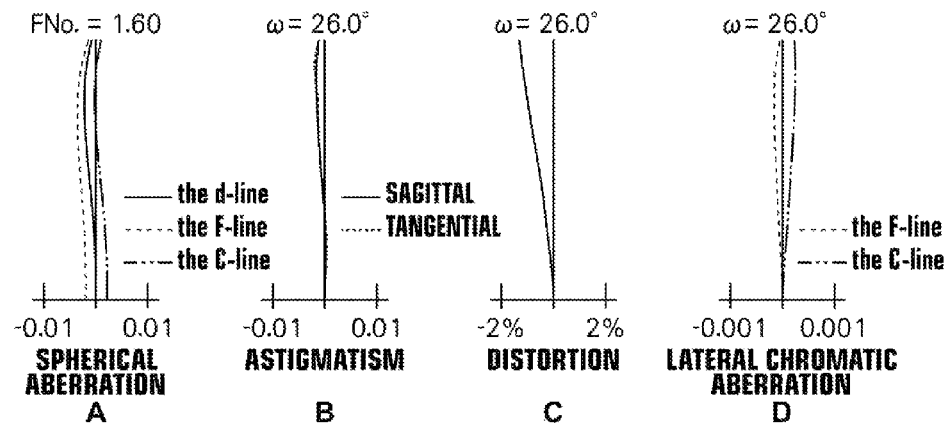
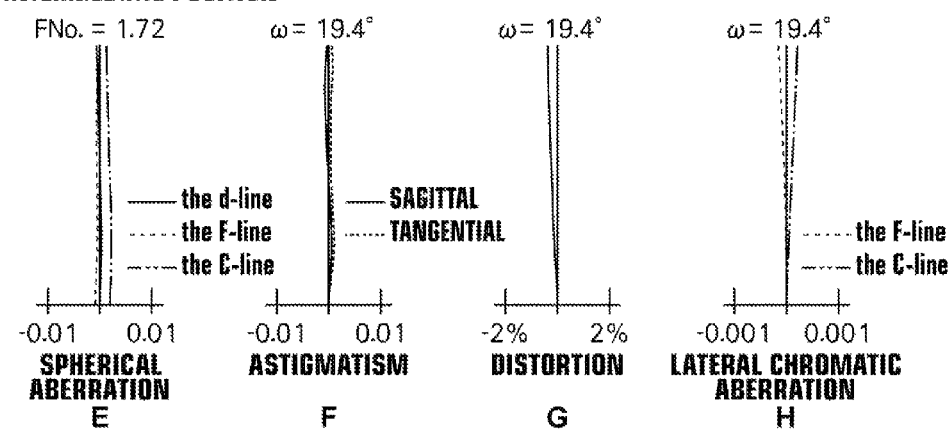
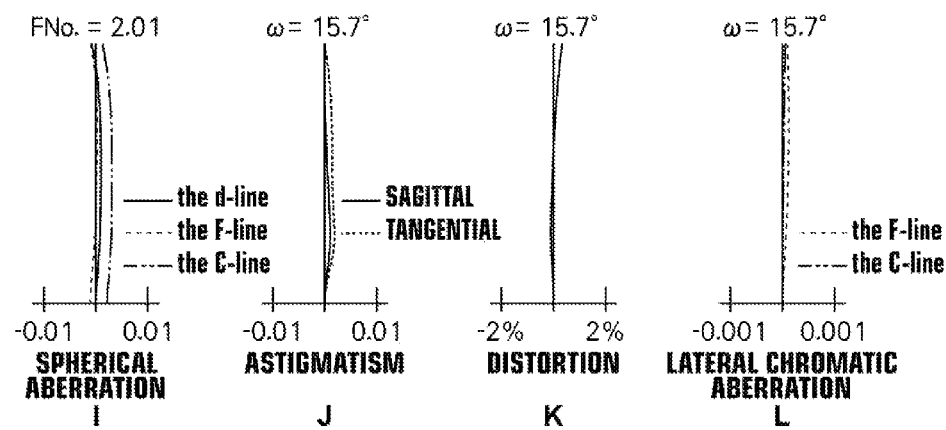

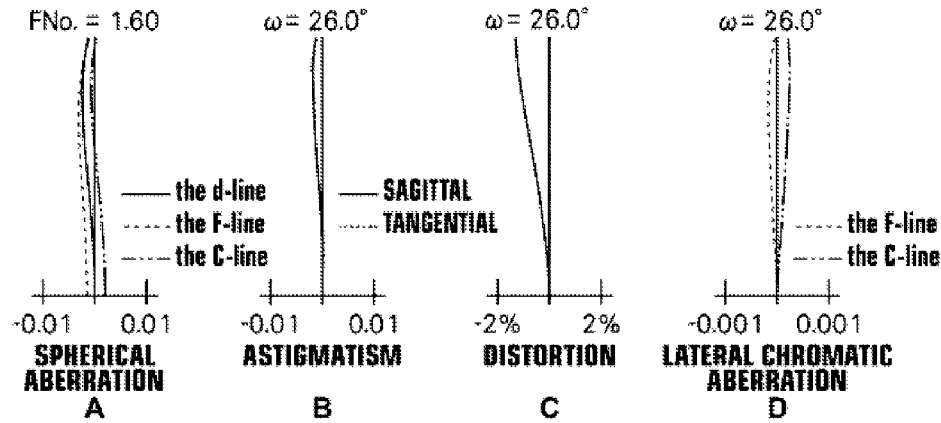
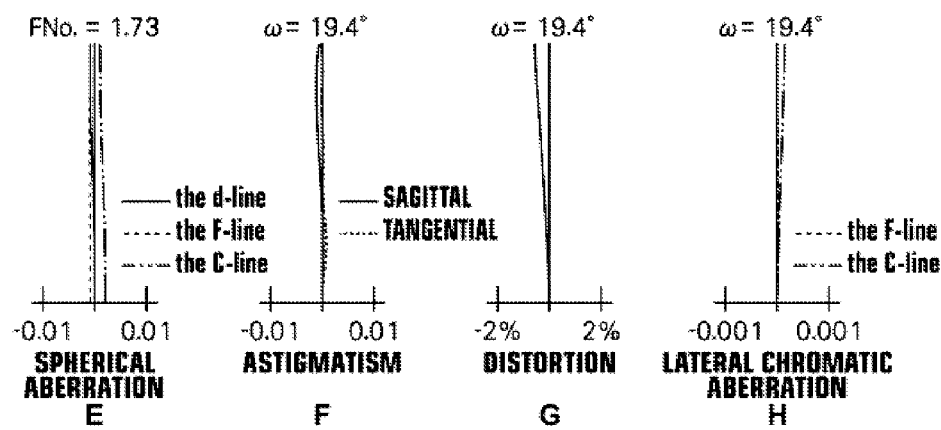
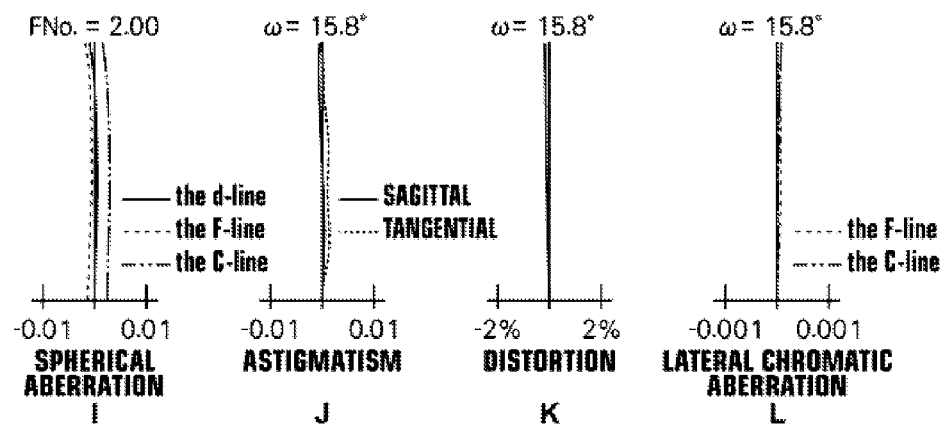
FIG.8 — EXAMPLE 4

FIG.9
WIDE ANGLE END
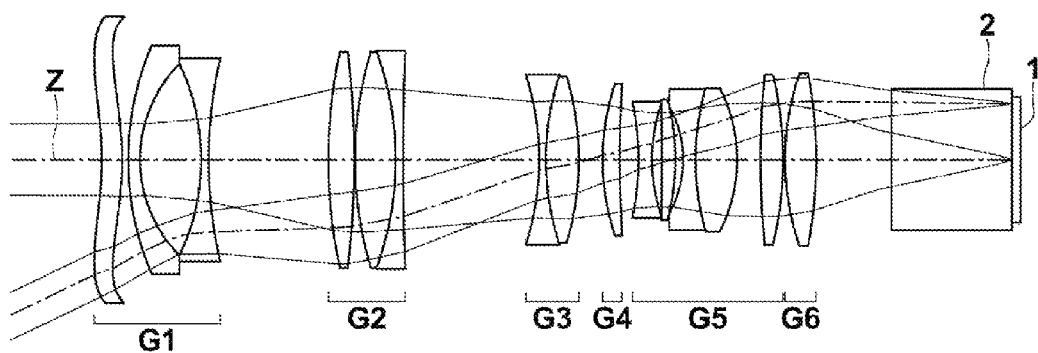
TELEPHOTO END
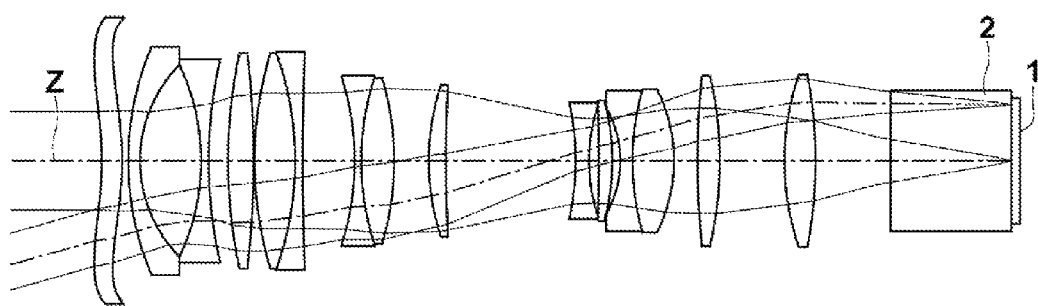

PROJECTION ZOOM LENS AND PROJECTION TYPE DISPLAY DEVICE

CROSS-REFERENCE TO RELATED APPLICATIONS

This application is a Continuation of PCT International Application No. PCT/JP2012/007234 filed on Nov. 12, 2012, which claims priority under 35 U.S.C §119 (a) to Japanese Patent Application No. 2011-254547 filed on Nov. 22, 2011. Each of the above application(s) is hereby expressly incorporated by reference, in its entirety, into the present application.

BACKGROUND OF THE INVENTION

The present invention relates to a zoom lens, and particularly to a projection zoom lens applied to a projection type display device.

The present invention also relates to a projection type display device including such a projection zoom lens.

DESCRIPTION OF THE RELATED ART

Recently, projection type display devices that utilize a light valve, such as a transmissive or reflective liquid crystal display device, a DMD display device, and the like, are becoming commonly available. Projection lenses applied to such kinds of projection type display devices are generally required to have a long back focus and to have an entrance pupil positioned sufficiently far away as viewed from the reduction side (light valve side), i.e., it is required for the reduction side to be telecentric. Further, this type of projection lens is required to be a lens having a small F-number, to enable aberration correction which is appropriate for resolutions of the display devices, and further to have a variable magnification function (a zoom function) taking portability of the devices and adaptability to installation conditions into consideration.

Projection zoom lenses having a six-group configuration, in which four lens groups are moved while changing magnification, and having a configuration, in which a short conjugation length side, i.e., the reduction side is telecentric, are conventionally known as such a projection zoom lens, as disclosed in the following Japanese Unexamined Patent Publication No. 2005-156804, Japanese Unexamined Patent Publication No. 2005-156805, Japanese Unexamined Patent Publication No. 2006-184723, and Japanese Unexamined Patent Publication No. 2008-242402.

Such zoom lenses substantially consist of a first lens group having negative refractive power, a second lens group having positive refractive power, a third lens group having positive refractive power, a fourth lens group having positive refractive power, a fifth lens group having positive or negative refractive power, and a sixth lens group having positive refractive power arranged in this order from the magnification side, wherein the first lens group and the sixth lens group are fixed and the second lens group through the fifth lens group move while changing magnification; and variations in various aberrations associated with changes in magnification are suppressed to a comparatively low level.

SUMMARY OF THE INVENTION

However, the projection zoom lenses disclosed in Japanese Unexamined Patent Publication No. 2005-156804 and Japanese Unexamined Patent Publication No. 2005-156805 have small FNos. (F-values) of 1.6, but have a low zoom ratio of approximately 1.2. In contrast, the projection zoom lens disclosed in Japanese Unexamined Patent Publication No. 2006-184723 has a zoom ratio of approximately 1.5× and a large FNo. of 2.0. The projection zoom lens disclosed in Japanese Unexamined Patent Publication No. 2008-242402 has a large FNo. and a small zoom ratio. As described above, the projection zoom lenses disclosed in Japanese Unexamined Patent Publication No. 2005-156804, Japanese Unexamined Patent Publication No. 2005-156805, Japanese Unexamined Patent Publication No. 2006-184723, and Japanese Unexamined Patent Publication No. 2008-242402 cannot sufficiently meet recent demands to secure high zoom ratios while having a sufficiently small F-number.

The present invention has been developed in view of such circumstances. It is an object of the present invention to provide a projection zoom lens which can have a sufficiently small F-number and a high zoom ratio as well as being capable of favorably correcting various aberrations.

Further, it is an object of the present invention to provide a projection display type device capable of displaying bright images of high quality and which further has a high zoom ratio, portability, and high adaptability to installation conditions, by including the projection zoom lens as described above.

The projection zoom lens according to the present invention substantially consists of a first lens group having negative refractive power, a second lens group having positive refractive power, a third lens group having positive refractive power, a fourth lens group having positive refractive power, a fifth lens group having positive or negative refractive power, and a sixth lens group having positive refractive power arranged in this order from the magnification side, wherein the reduction side is telecentric, the first lens group and the sixth lens group are fixed and the second lens group through the fifth lens group move along the optical axis while changing magnification, the fourth lens group substantially consists of only one positive meniscus lens (having positive refractive power) with a concave surface toward the reduction side, and conditional expression (1) below is satisfied:

$$1.2 < f3/f4 < 10.0 \qquad (1),$$

where f3: the focal length of the third lens group, and f4: the focal length of the fourth lens group.

The expression "substantially consists of . . . arranged" as described twice above means that the projection zoom lens may include lenses substantially without any power; optical elements other than lenses such as an aperture, a cover glass, and the like; and mechanical components such as lens flanges, lens barrels, imaging elements, and camera shake correction mechanisms, in addition to the lens groups and lenses which are listed therein as constituent elements.

The above expression "reduction side is telecentric" refers to a state in which a line bisecting the angle formed by a ray having a maximum height in the upper side and a ray having a maximum height in the bottom side is nearly parallel to the optical axis in across section of a light beam which is focused on an arbitrary point on an image surface on the reduction side. The above expression is not limited to a case that the reduction side is completely telecentric, that is, the line bisecting the angle is completely parallel to the optical axis, but also refers to cases in which a certain degree of error is present. Here, the certain degree of error refers to a range of inclination between the bisecting angular line and the optical axis of ±3°.

In the projection zoom lens of the present invention, the lenses that constitute each lens group may be cemented lenses. In the case that a cemented lens is constituted by bonding n numbers of lenses, the cemented lens will be counted as n lenses.

The surface shapes of lenses and the signs of refractive powers thereof in the projection zoom lens of the present invention should be considered in the paraxial region with respect to lenses including aspheric surfaces.

It is desirable for the projection zoom lens of the present invention to particularly satisfy conditional expression (1') below within the range defined by conditional expression (1) above:

$$1.6 < f3/f4 < 6.0 \quad (1').$$

In the projection zoom lens of the present invention, it is desirable for all the lens groups which move while changing magnification to move from the reduction side toward the magnification side in the case of changing magnification from the wide angle end toward the telephoto end.

It is desirable for the projection zoom lens of the present invention to satisfy conditional expression (2) below:

$$-4.0 < (R41f + R41r)/(R41f - R41r) < -0.5 \quad (2),$$

where
R41f: the radius of curvature on the magnification side surface of the meniscus lens, and
R41r: the radius of curvature on the reduction side surface of the meniscus lens.

Further, it is more desirable for the projection zoom lens of the present invention to satisfy conditional expression (2') below within the range defined by conditional expression (2) above:

$$-3.5 < (R41f + R41r)/(R41f - R41r) < -0.9 \quad (2').$$

In the projection zoom lens of the present invention, it is desirable for the third lens group to substantially consist of a cemented lens formed by a positive lens and a negative lens.

It is desirable for the projection zoom lens of the present invention to satisfy conditional expression (3) below:

$$1.5 \le ft/fw \quad (3),$$

where
fw: the focal length of the entire system at the wide angle end, and
ft: the focal length of the entire system at the telephoto end.

It is more desirable for the projection zoom lens of the present invention to satisfy conditional expression (3') below within the range defined by conditional expression (3) above:

$$1.6 \le ft/fw \quad (3').$$

It is desirable for the projection zoom lens of the present invention to satisfy conditional expression (4) below:

$$Fw < 1.9 \quad (4),$$

where
Fw: FNo. at the wide angle end.

It is more desirable for the projection zoom lens of the present invention to satisfy conditional expression (4') below within the range defined by conditional expression (4) above:

$$Fw < 1.7 \quad (4').$$

In the projection zoom lens of the present invention, it is desirable for the first lens group to include a lens having at least one aspheric surface.

In the projection zoom lens of the present invention, it is desirable for the entire first lens group to move in the direction of the optical axis so as to perform focusing.

The projection type display device of the present invention includes the projection zoom lens according to the present invention described above, in addition to a light source, a light valve, and an illumination optical section which guides a light beam from the light source to the light valve, wherein the light beam from the light source is optically modulated by the light valve and is projected onto a screen by the projection zoom lens.

The projection zoom lens of the present invention configured in the manner described above has a sufficiently small FNo., and can secure a high zoom ratio as shown in the numerical examples to be described later.

In the projection zoom lens of the present invention, the fourth lens group substantially consists of only one positive meniscus lens with a concave surface toward the reduction side. Therefore, the following advantageous effects are exhibited. In general, in zoom lenses with small FNos., axial light beams pass through each lens at a high position. As a result, variations in spherical aberration accompanying changes in magnification tend to be large. However, when a positive meniscus lens with a concave surface toward the reduction side is arranged in the fourth lens group, variations in spherical aberrations while changing magnification can be reduced. Moreover, the configuration, in which the fourth lens group substantially consists of a single lens in such a manner as described above, is advantageous from the viewpoint of cost reduction of the zoom lens.

As the projection zoom lens of the present invention satisfies conditional expression (1), the following advantageous effects will be exhibited. Conditional expression (1) defines the relationship between the focal length of the third lens group and the focal length of the fourth lens group. In the case that the power of the third lens group is excessively increased or the power of the fourth lens group is excessively decreased to a degree that the value of f3/f4 becomes lower than the lower limit defined by conditional expression (1); in the former case, correction of aberrations in the marginal image plane will be difficult, and in the latter case, the amount of movement of the lens groups for securing a predetermined zoom ratio will be increased, thereby making it difficult to shorten the total length of the lens. Inversely, in the case that the power of the third lens group is excessively decreased or the power of the fourth lens group is excessively increased to a degree that the value of f3/f4 becomes higher than the upper limit defined by conditional expression (1); in the former case, correction of longitudinal chromatic aberration will be difficult, and in the latter case, correction of spherical aberration will be difficult. In the case that conditional expression (1) is satisfied, various aberrations can be satisfactorily corrected, preventing the above problems.

The advantageous effects described above will be more prominent in the case that the conditional expression (1') is particularly satisfied within the range defined by conditional expression (1).

In the case that all the lens groups which move while changing magnification are configured to move from the reduction side toward the magnification side while changing magnification from the wide angle end to the telephoto end in the projection zoom lens of the present invention, a large amount of movement of the lens groups can be obtained. This is advantageous from the viewpoint of securing a high zoom ratio.

In the case that the projection zoom lens of the present invention satisfies conditional expression (2) in particular, the following advantageous effects can be exhibited. Conditional expression (2) defines the relationship between the radius of curvature on the magnification side surface and the radius of curvature on the reduction side surface of one positive meniscus lens that constitutes the fourth lens group. If the value of (R41f+R41r)/(R41f−R41r) is lower than the lower limit defined by conditional expression (2) or is higher than the upper limit defined by conditional expression (2), satisfactory correction of spherical aberration and astigmatism will become difficult. In the case that conditional expression (2) is satisfied, spherical aberration and astigmatism can be satisfactorily corrected, preventing the problems described above.

The advantageous effects described above will be more prominent in the case that the conditional expression (2') is particularly satisfied within the range defined by the conditional expression (2).

In the case that the third lens group substantially consists of a cemented lens formed by a positive lens and a negative lens in the projection zoom lens of the present invention, in particular, longitudinal chromatic aberration can be satisfactorily corrected.

In the case that the projection zoom lens of the present invention satisfies conditional expression (3) in particular, the following advantageous effects can be exhibited. Conditional expression (3) defines the relationship between the focal length of the entire system at the wide angle end and the focal length of the entire system at the telephoto end. If the value of ft/fw is lower than the lower limit defined by conditional expression (3), meeting the demand for a higher zoom ratio will be difficult. In the case that conditional expression (3) is satisfied, a higher zoom ratio can be easily achieved.

The advantageous effects described above will be more prominent in the case that the conditional expression (3') is particularly satisfied within the range defined by the conditional expression (3).

In the case that the projection zoom lens of the present invention satisfies conditional expression (4) in particular, the following advantageous effects can be exhibited. Conditional expression (4) defines FNo. at the wide angle end. If the value of Fw is higher than the upper limit defined by conditional expression (4), it will be difficult for the lens to secure a necessary F-number. In the case that conditional expression (4) is satisfied, the lens can easily secure a necessary F-number.

The advantageous effects described above will be more prominent in the case that the conditional expression (4') is particularly satisfied within the range defined by the conditional expression (4).

In the case that the projection zoom lens of the present invention is configured to perform focusing by moving the first lens group as a whole in the direction of the optical axis in particular, arrangement of the focusing mechanism is simplified, compared to a case in which focusing is performed by moving the other lens groups.

The projection type display device of the present invention can display bright images with high quality due to the projection zoom lens according to the present invention constituting the device, which has a sufficiently small F-number and is capable of satisfactorily correcting various aberrations as described above. Further, this projection zoom lens can secure a high zoom ratio as described above, and the device can have high portability and adaptability to installation conditions.

BRIEF DESCRIPTION OF THE DRAWINGS

FIG. 1 is a collection of cross-sectional views of a projection zoom lens according to Example 1 of the present invention, illustrating the lens configuration thereof.

FIG. 2 is a collection of cross-sectional views of a projection zoom lens according to Example 2 of the present invention, illustrating the lens configuration thereof.

FIG. 3 is a collection of cross-sectional views of a projection zoom lens according to Example 3 of the present invention, illustrating the lens configuration thereof.

FIG. 4 is a collection of cross-sectional views of a projection zoom lens according to Example 4 of the present invention, illustrating the lens configuration thereof.

FIG. 5 shows aberration diagrams A through L of the projection zoom lens according to the above Example 1.

FIG. 6 shows aberration diagrams A through L of the projection zoom lens according to the above Example 2.

FIG. 7 shows aberration diagrams A through L of the projection zoom lens according to the above Example 3.

FIG. 8 shows aberration diagrams A through L of the projection zoom lens according to the above Example 4.

FIG. 9 shows a diagram illustrating light beam paths in the projection zoom lens according to the above Example 1.

DETAILED DESCRIPTION OF THE PREFERRED EMBODIMENTS

Figure 10:
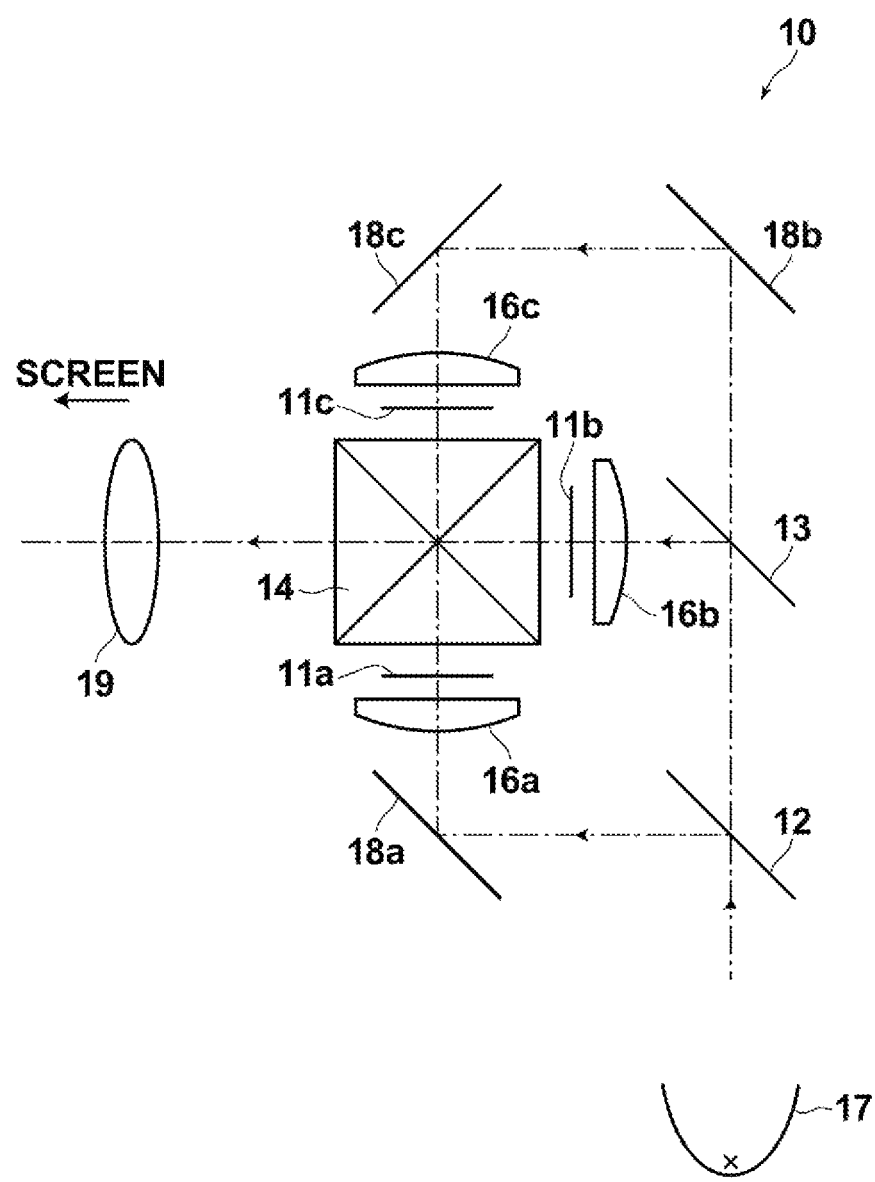
FIG. 10 is a schematic configuration diagram of a projection type display device according to an embodiment of the present invention.

Hereinafter, embodiments of the present invention will be described in detail with reference to the accompanying drawings. First, a projection zoom lens according to one embodiment of the present invention will be described with reference to FIG. 1. FIG. 1 illustrates moving positions of the lens groups from the wide angle end to the telephoto end in the case that the projection zoom lens according to Example 1 of the present invention is operated to change magnification. Note that in FIG. 1, the directions of movement of the lens groups that move while changing magnification from the wide angle end to the telephoto end are schematically indicated by the arrows between each position.

FIGS. 2 through 4 are cross-sectional views illustrating examples of other configurations according to the embodiments of the present invention, corresponding to projection zoom lenses according to Examples 2 through 4 to be described later. The basic configurations of these projection zoom lenses are substantially the same as that of Example 1 except that the number of lenses of the first lens group in Examples 3 and 4 is less by one than in Example 1. Accordingly, the embodiments of the present invention will be described below mainly with reference to the configuration illustrated in FIG. 1 as an example.

The projection zoom lens of the present embodiments can be used as a projection lens which projects image information displayed on a light valve onto a screen, for example. In FIG. 1, the left side is designated as the magnification side and the right side is designated as the reduction side. Further, supposing a case that the projection zoom lens is mounted on the projection type display devices, FIG. 1 also shows a glass block 2, such as a color combining prism (which includes a filter and the like), and an image display surface 1 of the light valve which lies on the reduction side surface of the glass block 2.

In the projection type display device, a light beam which has been provided with image information at the image display surface 1 enters this projection zoom lens via the glass block 2. Then, the projection zoom lens enlarges and projects images based on the image information onto a screen (not shown) disposed toward the leftward direction of the drawing sheet.

Note that although FIG. 1 shows an example in which the position of a surface on the reduction side of the glass block 2 matches the position of the image display surface 1. However, the projection zoom lens of the present invention is not limited to such a configuration. Further, although FIG. 1 shows only one image display surface 1, the projection type display device may be configured to separate the light beam from the light source into the three primary colors by a color separation optical system, to be provided with three light valves which respectively correspond to the three primary colors, and to enable display of full color images.

The projection zoom lens according to the present embodiment substantially consists of a first lens group G1 having negative refractive power, a second lens group G2 having positive refractive power, a third lens group G3 having positive refractive power, a fourth lens group G4 having positive refractive power, a fifth lens group G5 having positive or negative refractive power, and a sixth lens group G6 having positive refractive power arranged in this order from the magnification side, wherein the reduction side is telecentric. The first lens group G1 and the sixth lens group G6 are fixed while changing magnification; and the second lens group G2, the third lens group G3, the fourth lens group G4, and the fifth lens group G5 are designated as a plurality of lens groups (hereinafter referred to as lens groups which move while changing magnification) which move while changing magnification.

As shown in an example of FIG. 1, the first lens group G1 substantially consists of three lenses (the first lens L1 through the third lens L3), the second lens group G2 substantially consists of three lenses (the fourth lens L4 through the sixth lens L6), the third lens group G3 substantially consists of two lenses (the seventh lens L7 and the eighth lens L8), the fourth lens group G4 substantially consists of one lens (the ninth lens L9), the fifth lens group G5 substantially consists of five lenses (the tenth lens L10 through the fourteenth lens L14), and the sixth lens group substantially consists of one lens (the fifteenth lens L15).

However, the number of lenses that constitute each lens group of the projection zoom lens of the present invention is not necessarily limited to the example of FIG. 1. For example, in the projection zoom lenses of Examples 3 and 4 to be described later, the first lens group G1 substantially consists of two lenses.

In the projection zoom lens of the present embodiment, all the lens groups G2 through G5 which move while changing magnification are configured to move from the reduction side toward the magnification side while changing magnification from the wide angle end to the telephoto end. This enables an increase in the amount of movement of the lens groups to be obtained, which is advantageous from the viewpoint of securing a high zoom ratio.

In the projection zoom lens of the present embodiments, the fourth lens group G4 substantially consists of only one ninth lens L9 which is a positive meniscus lens with a concave surface toward the reduction side. Therefore, the following advantageous effects are obtained. In general, in zoom lenses having small FNos., axial light beams pass through each lens at a high position and variations in spherical aberration while changing magnification tends to be increased. However, by disposing a positive meniscus lens with a concave surface toward the reduction side in the fourth lens group G4, variations in spherical aberration while changing magnification can be reduced. Further, a configuration, in which the fourth lens group substantially consists of a single lens in such a manner as described above, is advantageous from the viewpoint of cost reduction of the zoom lens.

The projection zoom lens of the present embodiments satisfies conditional expression (1) when the focal length of the third lens group G3 is designated as f3 and the focal length of the fourth lens group G4 is designated as f4:

$$1.2 < f3/f4 < 10.0 \qquad (1).$$

The projection zoom lens further satisfies conditional expression (1') below within the range defined by conditional expression (1):

$$1.6 < f3/f4 < 6.0 \qquad (1').$$

Values defined by conditional expression (1) are listed for each Example in Table 13 to be shown below (the same applies to the other conditional expressions to be described later).

By configuring the projection zoom lens of the present embodiments to satisfy conditional expression (1), longitudinal chromatic aberration, spherical aberration and the like can be favorably corrected. The detailed reasons therefore are as described above. The advantageous effects described above will be more prominently obtained because conditional expression (1') is particularly satisfied within the range defined by conditional expression (1).

The projection zoom lens of the present embodiments satisfies conditional expression (2) when the radius of curvature on the magnification side surface of the ninth lens L9, which is a positive meniscus lens, is designated as R41f and the radius of curvature on the reduction side surface thereof is designated as R41r as described above:

$$-4.0 < (R41f + R41r)/(R41f - R41r) < -0.5 \qquad (2).$$

The projection zoom lens further satisfies conditional expression (2') below within the range defined by conditional expression (2):

$$-3.5 < (R41f + R41r)/(R41f - R41r) < -0.9 \qquad (2').$$

Thereby, the projection zoom lens of the present embodiments can favorably correct spherical aberration and astigmatism. The detailed reasons thereof are as described above. The advantageous effects described above will be more prominently obtained because conditional expression (2') is particularly satisfied within the range defined by conditional expression (2).

In the projection zoom lens of the present invention, the third lens group G3 substantially consists of a cemented lens formed by the eighth lens L8 which is a positive lens and the seventh lens L7 which is a negative lens, thereby enabling favorable correction of longitudinal chromatic aberration.

The projection zoom lens of the present embodiments satisfies conditional expression (3) when the focal length of the entire system at the wide angle end is designated as fw and the focal length of the entire system at the telephoto end is designated as ft:

$$1.5 \le ft/fw \qquad (3).$$

The projection zoom lens further satisfies conditional expression (3') below within the range defined by conditional expression (3) in particular:

$$1.6 \le ft/fw \qquad (3').$$

Thereby, the projection zoom lens of the present embodiment can easily have higher zoom ratios. The detailed reasons therefore are as described above. The advantageous effects described above will be more prominently obtained because conditional expression (3') is particularly satisfied within the range defined by conditional expression (3).

The projection zoom lens of the present embodiment satisfies conditional expression (4) when the FNo. at the wide angle end is designated as Fw:

$$Fw<1.9 \qquad (4).$$

The projection zoom lens further satisfies conditional expression (4') below within the range defined by conditional expression (4) in particular:

$$Fw<1.7 \qquad (4').$$

Thereby, the projection lens of the present embodiments can easily secure a necessary small F-number. Further, the advantageous effects described above will be more prominently obtained because conditional expression (4') is particularly satisfied within the range defined by conditional expression (4).

The projection zoom lens of the present embodiments is configured such that focusing is performed by moving the first lens group G1 as a whole in the direction of the optical axis. Thereby, the arrangement of the focusing mechanism is simplified, compared to a case in which focusing is performed by moving the other lens groups.

Figure 11:
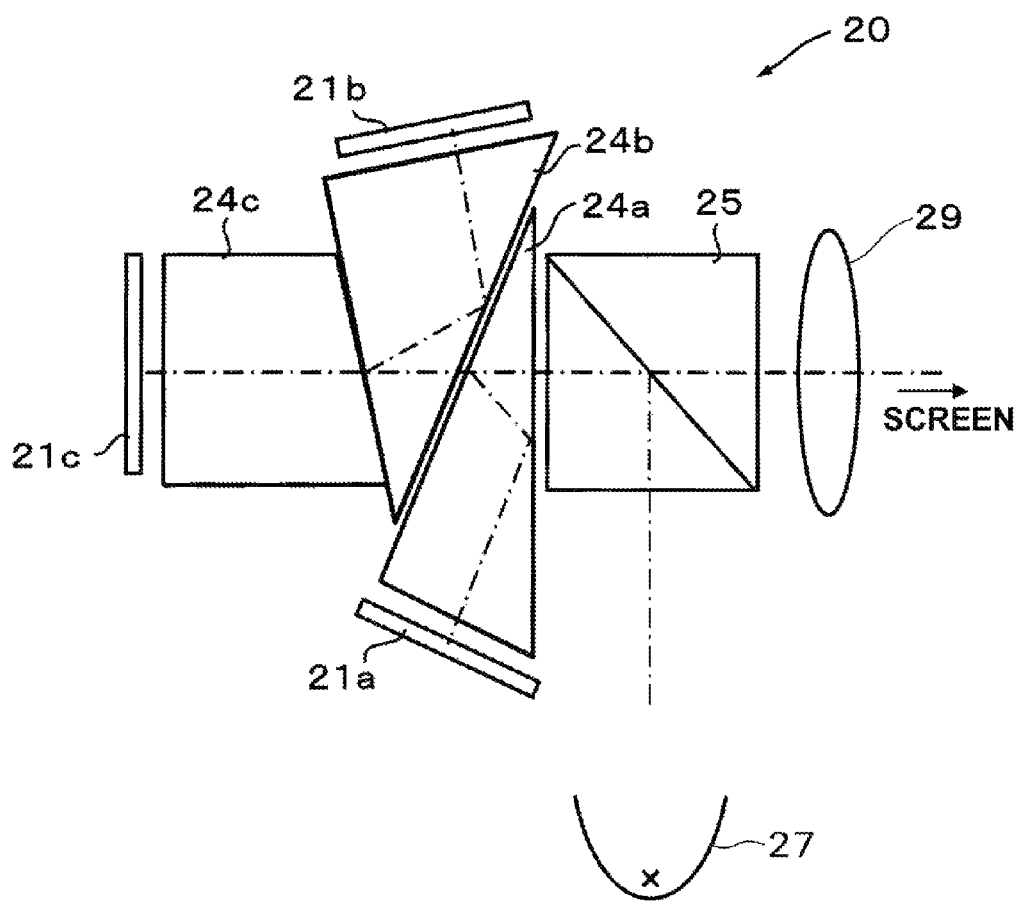
FIG. 11 is a schematic configuration diagram of a projection type display device according to another embodiment of the present invention.

Next, the projection type display device according to the present invention will be described with reference to FIGS. 10 and 11. FIG. 10 is a schematic configuration diagram of a part of a projection type display device according to an embodiment of the present invention. FIG. 11 is a schematic configuration diagram of a part of a projection type display device according to another embodiment of the present invention.

The projection type display device shown in FIG. 10 includes an illumination optical system (an illumination optical section) 10 having an optical modulation function and a projection zoom lens 19 according to the embodiments as described above. The illumination optical system 10 is composed by transmissive liquid crystal panels 11a, 11b, and 11c which are light valves; dichroic mirrors 12 and 13 for color separation; a cross dichroic prism 14 as a light beam combining optical system for combining the light beams which passed through the transmissive liquid crystal panels 11a through 11c; condenser lenses 16a, 16b, and 16c; a light source 17 which emits a white light beam; and mirrors 18a, 18b, and 18c. Note that an integrator such as a fly-eye lens is arranged between the light source 17 and the dichroic mirror 12, although not shown in FIG. 10.

In the above configuration, the white light beam emitted from the light source 17 is separated into three kinds of colored light beams (G light, B light, and R light) by the dichroic mirrors 12 and 13 to enter the liquid crystal panels 11a through 11c respectively corresponding to each color.

The respective colored light beams which entered the liquid crystal panels 11a through 11c are optically modulated based on each of the color image signals in each of the liquid crystal panels 11a through 11c. Each of the modulated colored light beams are combined by the cross dichroic prism 14, and then are projected on to a screen (not shown) by the projection zoom lens 19. Thereby, full colored images formed by the above respective colored light beams are projected and displayed onto the screen.

The light valves are not limited to the transmissive liquid crystal panels 11a through 11c as described above, and other optical modulation means such as reflection type liquid crystal display panels, DMD's, or the like can be adopted as appropriate.

The projection type display device according to the other embodiment illustrated in FIG. 11 includes reflection type display elements 21a through 21c as light valves respectively corresponding to the colored light beams, TIR (Total Internal Reflection) prisms 24a through 24c for a color separation and color composition, an illumination optical system 20 having a polarized light separation prism 25, and the projection zoom lens 19 according to the embodiments as described above. Further, a light source 27 which emits a light beam to be modulated based on each of the colored image signals in the reflection type display elements 21a through 21c is disposed in the front of the polarized light separation prism 25.

A white light beam emitted from the light source 27 passes through the polarized light separation prism 25, and then is separated into three colored light (G light, B light, and R light) by the TIR prisms 24a through 24c. The separated colored light beams respectively enter the reflection type display elements 21a through 21c corresponding thereto to be optically modulated. The optically modulated light beams travel again through the TIR prism 24a through 24c in the opposite direction to be combined, and then are transmitted through the polarized light separation prism 25 to enter the projection zoom lens 29. Then, optical images formed by the entered light are projected and displayed onto a screen (not shown) by the projection zoom lens 29.

Next, specific Examples of the projection zoom lens of the present invention will be described. Note that all of the projection zoom lenses of Examples 1 through 4 to be described below have a six-group configuration and all of the lenses other than the first lens L1 are spherical lenses.

EXAMPLE 1

FIG. 1 illustrates an arrangement of the lens groups at each of the wide angle end and the telephoto end in the projection zoom lens of Example 1. Note that since a detailed descriptions of FIG. 1 has already been given, redundant descriptions will be omitted unless particularly necessary.

The projection zoom lens of Example 1 has a six-group configuration in which a first lens group G1 having negative refractive power, a second lens group G2 having positive refractive power, a third lens group G3 having positive refractive power, a fourth lens group G4 having positive refractive power, a fifth lens group G5 having positive refractive power, and a sixth lens group G6 having positive refractive power, arranged in this order from the magnification side. Note that the fifth lens group G5 may have negative refractive power, and such a configuration is adopted in Examples 3 and 4 to be described later.

This projection zoom lens is configured such that the reduction side is telecentric, and the image display surface 1 of the light valves, such as the transmissive liquid crystal display panels, and a glass block 2 of the color combining prism (which includes filters, such as an infrared ray cut-off filter, a low pass filter, and the like), or the like are disposed on the reduction side of the sixth lens group G6.

In the projection zoom lens of the present Examples, the first lens group G1 and the sixth lens group G6 are fixed and the other lens groups which move while changing magnification, i.e., the second lens group G2 through the fifth lens group G5 move while changing magnification.

The first lens group G1 substantially consists of a first lens L1 which is a positive meniscus lens with both surfaces being aspheric and with a convex surface toward the reduction side in a paraxial region, a second lens L2 which is a negative meniscus lens with a concave surface toward the reduction side, and a third lens L3 which is a biconcave lens arranged in this order from the magnification side.

The second lens group G2 substantially consists of a fourth lens L4 which is a biconvex lens, a fifth lens L5 which is a biconvex lens, and a sixth lens L6 which is a biconcave lens, in this order from the magnification side. The fifth lens L5 and the sixth lens L6 are cemented to each other.

The third lens group G3 substantially consists of a seventh lens L7 which is a biconcave lens; and an eighth lens L8 which is a biconvex lens in this order from the magnification side. The seventh lens L7 and the eighth lens L8 are cemented to each other.

The fourth lens group G4 substantially consists of only a ninth lens L9 which is a positive meniscus lens with a convex lens toward the magnification side.

The fifth lens group G5 substantially consists of a tenth lens L10 which is a biconcave lens; an eleventh lens L11 which is a positive meniscus lens with a convex surface toward the reduction side; a twelfth lens L12 which is a biconcave lens; a thirteenth lens L13 which is a biconvex lens; and a fourteenth lens L14 which is a biconvex lens, arranged in this order from the magnification. Note that the twelfth lens L12 and the thirteenth lens L13 are cemented to each other.

The sixth lens group G6 substantially consists of only a fifteenth lens L15 which is a biconvex lens.

FIG. 9 shows light beam paths of the projection zoom lens according to Example 1 at each of the wide angle end and the telephoto end.

Table 1 shows basic lens data of the projection zoom lens of Example 1. The glass block 2 is also shown therein. In Table 1, i-th (i=1, 2, 3, . . . ) surface numbers, the value of i sequentially increasing from the surface of the constituent element at the most-magnification side, which is designated as 1, toward the reduction side, are shown in the column Si. The radii of curvature of i-th surfaces are shown in the column Ri, and distances between i-th surfaces and (i+1) st surfaces along the optical axis Z1 are shown in the column Di. Further, the refractive indices of j-th (j=1, 2, 3, . . . ) constituent elements with respect to the d-line (wavelength: 587.6 nm), the value of j sequentially increasing from the constituent element at the most magnification side, which is designated as 1, toward the reduction side, are shown in the column Ndj. The Abbe numbers of j-th constituent elements with respect to the d-line are shown in the column vdj.

Note that the values of the radius of curvature R and the distance between surfaces D shown in Table 1 are standardized such that the focal length of the entire system of the projection zoom lens at the wide angle end becomes 1.0. The numerical values in Table 1 are rounded to a predetermined number of digits. The sign of the radius of curvature is positive in the case that a surface shape is convex on the magnification side, and negative in the case that the surface shape is convex on the reduction side.

Among the distances between surfaces D, the distance between the first lens group G1 and the second lens group G2, the distance between the second lens group G2 and the third lens group G3, the distance between the third lens group G3 and the fourth lens group G4, the distance between the fourth lens group G4 and the fifth lens group G5, and the distance between the fifth lens group G5 and the sixth lens group G6 change while changing magnification. DD 6, DD 11, DD 14, DD 16, and DD 28, which are respectively represented by indicating "D" with the surface number of the frontward surface from which the distance is measured, are respectively shown in the spaces of the distance between surfaces corresponding to these distances.

Regarding the five numbers of the distances between variable lens groups as listed above, although the numbers that follow "D" change according to the number of the constituent elements in each of the Examples, each of the distances between the variable lens groups is represented by indicating the surface number of the frontward surface from which the distance is measured in the same manner in all of the Tables.

Table 2 shows the projection distance, the focal length f of the entire system, and values of the variable distances D6, D11, D14, D16, and D28 at each of the wide angle end, an intermediate focal position, and the telephoto end while changing magnification in the project zoom lens of Example 1. These numerical values are also standardized such that the focal length of the entire system at the wide angle end is 1.0. As shown herein, the projection zoom lens of the present embodiment has a zoom ratio of 1.70 and secures a higher zoom ratio, compared to the conventional projection zoom lenses disclosed in Japanese Unexamined Patent Publication No. 2005-156804, Japanese Unexamined Patent Publication No. 2005-156805, Japanese Unexamined Patent Publication No 2006-184723, and Japanese Unexamined Patent Publication No. 2008-242402. This point similarly applies to the projection zoom lenses of Examples 2 through 4 to be described later.

Table 3 shows aspheric data of the projection zoom lens of Example 1. Surface numbers of the aspheric surfaces and aspheric surface coefficients with respect to the aspheric surfaces are shown therein. Note that the aspheric surface coefficients are the values of respective coefficients K, Bi (i=3 through 16) in aspheric surface formula 1 below:

TABLE 1

EXAMPLE 1: Basic Lens Data

| Si Surface Number | Ri Radius of Curvature | Di Distance Between Surfaces | Ndj Refractive Index | vdj Abbe Number |
| --- | --- | --- | --- | --- |
| 1* | −2.730 | 0.175 | 1.4910 | 57.58 |
| 2* | −2.589 | 0.054 | | |
| 3 | 2.505 | 0.100 | 1.6204 | 60.29 |
| 4 | 1.172 | 0.526 | | |
| 5 | −1.915 | 0.066 | 1.4970 | 81.61 |
| 6 | 3.935 | D6 | | |
| 7 | 4.374 | 0.222 | 1.8061 | 33.27 |
| 8 | −7.812 | 0.007 | | |
| 9 | 3.256 | 0.349 | 1.8340 | 37.16 |
| 10 | −2.725 | 0.062 | 1.8467 | 23.78 |
| 11 | 21.700 | D11 | | |
| 12 | −2.395 | 0.057 | 1.5955 | 39.24 |
| 13 | 2.314 | 0.282 | 1.6968 | 55.53 |
| 14 | −2.532 | D14 | | |
| 15 | 2.063 | 0.146 | 1.7015 | 41.24 |
| 16 | 10.425 | D16 | | |
| 17 | −2.378 | 0.115 | 1.7174 | 29.52 |
| 18 | 1.499 | 0.085 | | |
| 19 | −19.407 | 0.115 | 1.7725 | 49.60 |
| 20 | −2.023 | 0.068 | | |
| 21 | −0.930 | 0.105 | 1.6541 | 39.68 |
| 22 | 2.226 | 0.357 | 1.6180 | 63.33 |
| 23 | −1.364 | 0.201 | | |
| 24 | 7.142 | 0.193 | 1.7859 | 44.20 |
| 25 | −3.143 | D25 | | |
| 26 | 2.269 | 0.267 | 1.4970 | 81.61 |
| 27 | −3.972 | 0.648 | | |
| 28 | ∞ | 1.034 | 1.5163 | 64.14 |
| 29 | ∞ | | | |

*Aspheric Surface

TABLE 2

Example 1: Data Regarding Zooming

| Specs | Wide Angle End | Intermediate Position | Telephoto End |
|---|---|---|---|
| Projection Distance | 156.922 | 214.984 | 263.915 |
| f | 1.00 | 1.37 | 1.70 |
| D6 | 1.027 | 0.416 | 0.165 |
| D11 | 1.172 | 0.950 | 0.447 |
| D14 | 0.205 | 0.137 | 0.297 |
| D16 | 0.162 | 0.723 | 1.117 |
| D25 | 0.018 | 0.355 | 0.554 |

TABLE 3

Example 1: Aspheric Surface Data

| Aspheric Surface Coefficient: S1 | | Aspheric Surface Coefficient: S2 | |
|---|---|---|---|
| K | −1.46131 | K | −68.22073 |
| B3 | 0.00000 | B3 | 0.00000 |
| B4 | 0.03087 | B4 | −0.47466 |
| B5 | 0.80117 | B5 | 0.70697 |
| B6 | −2.09194 | B6 | 2.18110 |
| B7 | 2.51390 | B7 | −8.45358 |
| B8 | −1.35907 | B8 | 11.33350 |
| B9 | −0.12616 | B9 | −5.17836 |
| B10 | 0.64962 | B10 | −2.57573 |
| B11 | −0.48845 | B11 | 2.42572 |
| B12 | 0.18541 | B12 | 0.39755 |
| B13 | 0.29208 | B13 | 1.91557 |
| B14 | −0.58248 | B14 | −4.74575 |
| B15 | 0.37593 | B15 | 3.20931 |
| B16 | −0.08409 | B16 | −0.73215 |

$$Z = \frac{C \cdot Y^2}{1 + \sqrt{1 - K \cdot C^2 \cdot Y^2}} + \sum_{i=3}^{16} B_i Y^i$$

Z: the length of a perpendicular line drawn from a point on an aspheric surface with a height h from the optical axis to a tangent plane (a plane perpendicular to the optical axis) on the peak of the aspheric surface Y: a height from the optical axis K: an eccentricity C: an inverse number of paraxial radius R of the aspheric surface Bi: an aspheric surface coefficient (i=3 through 16)

Table 13 shows conditions defined by conditional expressions (1) through (4), i.e., the values of the equations and the values of conditions associated therewith are respectively indicated for Examples 1 through 4. The values of Table 13 are related to the d-line. As shown herein, all the projection zoom lens of Example 1 and the projection zoom lenses of Examples 2 through 4 to be described later satisfy conditional expressions (1) through (4) and also satisfy conditional expressions (1') through (4') which indicate more preferable ranges within the ranges defined by conditional expressions (1) through (4). The advantageous effects obtained thereby are as described above.

A through D of FIG. 5 respectively show aberration diagrams of spherical aberration, astigmatism, distortion, and lateral chromatic aberration of the projection zoom lens according to Example 1, at the wide angle end. E through H of FIG. 5 respectively show aberration diagrams of spherical aberration, astigmatism, distortion, and lateral chromatic aberration of the projection zoom lens according to Example 1, at the intermediate focal position. I through L of FIG. 5 respectively show aberration diagrams of spherical aberration, astigmatism, distortion, and lateral chromatic aberration of the projection zoom lens according to Example 1, at the telephoto end.

Each of the aberration diagrams of A through L of FIG. 5 applies the d-line as a reference. However, the spherical aberration diagram shows aberrations with respect to the F-line (wavelength: 486.1 nm) and the C-line (wavelength: 656.3 nm) as well, and the lateral chromatic aberration diagram also shows aberrations with respect to the F-line and the C-line. Further, the astigmatism diagram shows aberration in a sagittal direction with a solid line and aberration in a tangential direction with a broken line. The sign "Fno.", which is indicated above the vertical axis in the spherical aberration diagram, refers to a F-value, and the sign "ω", which is indicated above the vertical axis in the other aberration diagrams, refers to a half angle of view. As shown herein, the FNo. of the projection zoom lens of the present Example is 1.6, which is smaller compared to the conventional projection zoom lenses disclosed in Japanese Unexamined Patent Publication No. 2005-156804, Japanese Unexamined Patent Publication No. 2005-156805, Japanese Unexamined Patent Publication No. 2006-184723, and Japanese Unexamined Patent Publication No. 2008-242402 described above. This point similarly applies to the projection zoom lenses of Examples 2 through 4 to be described later.

Arrangement diagrams of lens groups, the symbols in the Tables and the aberration diagrams, the meanings thereof, and the manners in which they are shown for Example 1 described above are basically the same for Examples 2 through 4 below, unless otherwise noted. The points that the arrangement diagrams (FIG. 1) of the lens groups of Example 1 described above are at the wide angle end and at the telephoto end, and that the aberration diagrams are at the wide angle end, the intermediate focal position, and the telephoto end also apply to Examples 2 through 4.

EXAMPLE 2

FIG. 2 shows the arrangement of lens groups in the projection zoom lens of Example 2 at each of the wide angle end and the telephoto end. The projection zoom lens of Example 2 has the same basic configuration as the projection zoom lens of Example 1 described above.

Table 4 shows the basic lens data of the projection zoom lens of Example 2. Table 5 shows the projection distance, the focal length f of the entire system, and values of variable distances D6, D11, D14, D16, and D28 at each of the wide angle end, the intermediate focal point, and the telephoto end while changing magnification in the projection zoom lens of Example 2. Further, Table 6 shows aspheric surface data of the projection zoom lens of Example 2.

TABLE 4

EXAMPLE 2: Basic Lens Data

| Si Surface Number | Ri Radius of Curvature | Di Distance Between Surfaces | Ndj Refractive Index | νdj Abbe Number |
|---|---|---|---|---|
| 1* | −2.891 | 0.176 | 1.4910 | 57.58 |
| 2* | −2.749 | 0.053 | | |
| 3 | 2.288 | 0.073 | 1.6204 | 60.29 |
| 4 | 1.162 | 0.536 | | |
| 5 | −1.959 | 0.066 | 1.5163 | 64.14 |

TABLE 4-continued

EXAMPLE 2: Basic Lens Data

| Si Surface Number | Ri Radius of Curvature | Di Distance Between Surfaces | Ndj Refractive Index | vdj Abbe Number |
|---|---|---|---|---|
| 6 | 3.856 | D6 | | |
| 7 | 4.490 | 0.223 | 1.8000 | 29.84 |
| 8 | −7.906 | 0.007 | | |
| 9 | 3.298 | 0.357 | 1.8340 | 37.16 |
| 10 | −2.681 | 0.062 | 1.8467 | 23.78 |
| 11 | 32.701 | D11 | | |
| 12 | −2.414 | 0.057 | 1.5955 | 39.24 |
| 13 | 2.058 | 0.312 | 1.6779 | 55.34 |
| 14 | −2.572 | D14 | | |
| 15 | 2.047 | 0.151 | 1.7234 | 37.95 |
| 16 | 12.135 | D16 | | |
| 17 | −2.621 | 0.111 | 1.7174 | 29.52 |
| 18 | 1.377 | 0.146 | | |
| 19 | −57.873 | 0.129 | 1.7725 | 49.60 |
| 20 | −1.959 | 0.063 | | |
| 21 | −0.982 | 0.107 | 1.6668 | 33.05 |
| 22 | 1.587 | 0.340 | 1.6516 | 58.55 |
| 23 | −1.591 | 0.204 | | |
| 24 | 7.563 | 0.188 | 1.8010 | 34.97 |
| 25 | −3.281 | D25 | | |
| 26 | 3.098 | 0.235 | 1.6204 | 60.29 |
| 27 | −3.914 | 0.638 | | |
| 28 | ∞ | 1.034 | 1.5163 | 64.14 |
| 29 | ∞ | | | |

*Aspheric Surface

TABLE 5

Example 2: Data Regarding Zooming

| Specs | Wide Angle End | Intermediate Position | Telephoto End |
|---|---|---|---|
| Projection Distance | 156.888 | 214.936 | 263.857 |
| f | 1.00 | 1.37 | 1.70 |
| D6 | 1.038 | 0.427 | 0.167 |
| D11 | 1.142 | 0.906 | 0.395 |
| D14 | 0.147 | 0.153 | 0.353 |
| D16 | 0.193 | 0.713 | 1.096 |
| D25 | 0.018 | 0.337 | 0.522 |

TABLE 6

Example 2: Aspheric Surface Data

| Aspheric Surface Coefficient: S1 | | Aspheric Surface Coefficient: S2 | |
|---|---|---|---|
| K | −0.63029 | K | −76.78500 |
| B3 | 0.00000 | B3 | 0.00000 |
| B4 | 0.08551 | B4 | −0.41274 |
| B5 | 0.51330 | B5 | 0.63155 |
| B6 | −1.45894 | B6 | 1.37253 |
| B7 | 1.97503 | B7 | −4.66014 |
| B8 | −1.77169 | B8 | 3.84963 |
| B9 | 2.13722 | B9 | 2.46260 |
| B10 | −4.06832 | B10 | −6.25998 |
| B11 | 5.37041 | B11 | 2.85853 |
| B12 | −3.47115 | B12 | 0.18605 |
| B13 | 0.34179 | B13 | 2.57237 |
| B14 | 0.83814 | B14 | −5.13418 |
| B15 | −0.43616 | B15 | 3.28205 |
| B16 | 0.06576 | B16 | −0.73421 |

A through L of FIG. 6 respectively show aberration diagrams of the projection zoom lens of Example 2.

EXAMPLE 3

FIG. 3 shows the arrangement of lens groups in the projection zoom lens of Example 3 at each of the wide angle end and the telephoto end. The projection zoom lens of Example 3 is of a configuration, in which the second lens L2 of the first lens group G1 illustrated in FIG. 1 is eliminated, when compared to the projection zoom lens of Example 1 described above. The other basic configurations are substantially the same as Example 1 except that a negative meniscus lens is applied as a first lens L1.

Table 7 shows the basic lens data of the projection zoom lens of Example 3. Table 8 shows the projection distance, the focal length f of the entire system, and values of variable distances D4, D9, D12, D14, and D23 at each of the wide angle end, the intermediate focal point, and the telephoto end while changing magnification in the projection zoom lens of Example 3. Further, Table 9 shows aspheric surface data of the projection zoom lens of Example 3.

TABLE 7

EXAMPLE 3: Basic Lens Data
Focal Length

| Si Surface Number | Ri Radius of | Di Distance Between Surfaces | Ndj Refractive Index | vdj Abbe Number |
|---|---|---|---|---|
| 1* | −4.054 | 0.178 | 1.4910 | 57.58 |
| 2* | −43.887 | 0.541 | | |
| 3 | −2.313 | 0.066 | 1.5891 | 61.14 |
| 4 | 1.966 | D4 | | |
| 5 | 9.287 | 0.194 | 1.8040 | 46.57 |
| 6 | −5.374 | 0.007 | | |
| 7 | 2.716 | 0.316 | 1.8010 | 34.97 |
| 8 | −3.711 | 0.062 | 1.8052 | 25.42 |
| 9 | 43.600 | D9 | | |
| 10 | −3.364 | 0.057 | 1.5481 | 45.79 |
| 11 | 1.632 | 0.354 | 1.6180 | 63.33 |
| 12 | −2.950 | D12 | | |
| 13 | 1.935 | 0.127 | 1.8040 | 46.57 |
| 14 | 4.360 | D14 | | |
| 15 | −2.991 | 0.041 | 1.5673 | 42.82 |
| 16 | 1.207 | 0.139 | | |
| 17 | −6.742 | 0.113 | 1.7995 | 42.22 |
| 18 | −1.644 | 0.052 | | |
| 19 | −0.945 | 0.045 | 1.7847 | 26.29 |
| 20 | 1.597 | 0.252 | 1.7292 | 54.68 |
| 21 | −1.633 | 0.283 | | |
| 22 | 20.659 | 0.190 | 1.8000 | 29.84 |
| 23 | −2.366 | D23 | | |
| 24 | 2.753 | 0.248 | 1.6180 | 63.33 |
| 25 | −3.461 | 0.550 | | |
| 26 | ∞ | 1.034 | 1.5163 | 64.14 |
| 27 | ∞ | | | |

*Aspheric Surface

TABLE 8

Example 3: Data Regarding Zooming

| Specs | Wide Angle End | Intermediate Position | Telephoto End |
|---|---|---|---|
| Projection Distance | 156.950 | 215.021 | 263.961 |
| f | 1.00 | 1.37 | 1.70 |
| D4 | 1.189 | 0.628 | 0.371 |
| D9 | 0.994 | 0.675 | 0.235 |
| D12 | 0.245 | 0.307 | 0.438 |
| D14 | 0.180 | 0.680 | 1.070 |
| D23 | 0.017 | 0.333 | 0.508 |

TABLE 9

Example 3: Aspheric Surface Data

| Aspheric Surface Coefficient: S1 | | Aspheric Surface Coefficient: S2 | |
|---|---|---|---|
| K | −0.50823 | K | 179.16090 |
| B3 | 0.00000 | B3 | 0.00000 |
| B4 | 0.23913 | B4 | 0.27236 |
| B5 | 0.72491 | B5 | 0.16616 |
| B6 | −2.29997 | B6 | 0.69280 |
| B7 | 2.79373 | B7 | −6.57481 |
| B8 | −1.52812 | B8 | 17.21040 |
| B9 | 0.17657 | B9 | −22.94270 |
| B10 | −0.10026 | B10 | 14.61320 |
| B11 | 1.04944 | B11 | −0.41439 |
| B12 | −2.08461 | B12 | 0.92439 |
| B13 | 1.90525 | B13 | −18.90290 |
| B14 | −0.43687 | B14 | 30.38620 |
| B15 | −0.45186 | B15 | −20.62630 |
| B16 | 0.23609 | B16 | 5.45742 |

A through L of FIG. 7 respectively show aberration diagrams of the projection zoom lens of Example 3.

EXAMPLE 4

FIG. 4 shows the arrangement of lens groups in the projection zoom lens of Example 4 at each of the wide angle end and the telephoto end. The projection zoom lens of Example 4 has substantially the same configuration as that of the projection zoom lens of Example 3 described above, but differs from Example 3 in that the order, in which a positive lens and a negative lens constituting the third lens group G3 are arranged, is reversed. That is, a biconvex lens is applied as the seventh lens L7 and a biconcave lens is applied as the eighth lens L8 in the present Example.

Table 10 shows the basic lens data of the projection zoom lens of Example 3. Table 11 shows the projection distance, the focal length f of the entire system, and values of variable distances D4, D9, D12, D14, and D23 at each of the wide angle end, the intermediate focal point, and the telephoto end while changing magnification in the projection zoom lens of Example 4. Further, Table 12 shows aspheric surface data of the projection zoom lens of Example 4.

TABLE 10

EXAMPLE 4: Basic Lens Data

| Si Surface Number | Ri Radius of Curvature | Di Distance Between Surfaces | Ndj Refractive Index | νdj Abbe Number |
|---|---|---|---|---|
| 1* | −3.404 | 0.178 | 1.4910 | 57.58 |
| 2* | −13.512 | 0.623 | | |
| 3 | −2.203 | 0.066 | 1.6180 | 63.33 |
| 4 | 2.067 | D4 | | |
| 5 | 8.858 | 0.182 | 1.8040 | 46.57 |
| 6 | −5.544 | 0.007 | | |
| 7 | 2.664 | 0.322 | 1.7205 | 34.71 |
| 8 | −3.216 | 0.062 | 1.8000 | 29.84 |
| 9 | 58.639 | D9 | | |
| 10 | 3.217 | 0.353 | 1.6180 | 63.33 |
| 11 | −1.569 | 0.057 | 1.5673 | 42.82 |
| 12 | 3.697 | D12 | | |
| 13 | 2.022 | 0.157 | 1.8040 | 46.57 |
| 14 | 28.437 | D14 | | |
| 15 | −2.739 | 0.050 | 1.6477 | 33.79 |
| 16 | 1.222 | 0.102 | | |
| 17 | −6.101 | 0.106 | 1.8044 | 39.59 |
| 18 | −1.811 | 0.064 | | |
| 19 | −0.882 | 0.055 | 1.7552 | 27.51 |
| 20 | 1.934 | 0.307 | 1.6968 | 55.53 |
| 21 | −1.348 | 0.223 | | |
| 22 | 16.067 | 0.194 | 1.8000 | 29.84 |
| 23 | −2.383 | D23 | | |
| 24 | 2.270 | 0.276 | 1.4970 | 81.61 |
| 25 | −3.244 | 0.572 | | |
| 26 | ∞ | 1.035 | 1.5163 | 64.14 |
| 27 | ∞ | | | |

*Aspheric Surface

TABLE 11

Example 4: Data Regarding Zooming

| Specs | Wide Angle End | Intermediate Position | Telephoto End |
|---|---|---|---|
| Projection Distance | 156.970 | 215.049 | 263.996 |
| f | 1.00 | 1.37 | 1.70 |
| D4 | 1.138 | 0.579 | 0.348 |
| D9 | 0.658 | 0.544 | 0.072 |
| D12 | 0.515 | 0.396 | 0.552 |
| D14 | 0.180 | 0.591 | 0.867 |
| D23 | 0.018 | 0.397 | 0.665 |

TABLE 12

Example 4: Aspheric Surface Data

| Aspheric Surface Coefficient: S1 | | Aspheric Surface Coefficient: S2 | |
|---|---|---|---|
| K | −0.53673 | K | 171.33557 |
| B3 | 0.00000 | B3 | 0.00000 |
| B4 | 0.30573 | B4 | 0.29874 |
| B5 | 0.50930 | B5 | 0.52741 |
| B6 | −1.70481 | B6 | −1.69981 |
| B7 | 1.22061 | B7 | −0.52628 |
| B8 | 2.49676 | B8 | 14.13230 |
| B9 | −6.89944 | B9 | −36.83910 |
| B10 | 5.02017 | B10 | 33.87220 |
| B11 | 5.05870 | B11 | 19.99250 |
| B12 | −11.48350 | B12 | −58.68900 |
| B13 | 4.99802 | B13 | 7.87608 |
| B14 | 4.12709 | B14 | 63.63470 |
| B15 | −4.72360 | B15 | −59.11000 |
| B16 | 1.31406 | B16 | 16.83830 |

TABLE 13

| | Example 1 | Example 2 | Example 3 | Example 4 |
|---|---|---|---|---|
| fw | 1.00 | 1.00 | 1.00 | 1.00 |
| ft | 1.70 | 1.70 | 1.70 | 1.70 |
| f1/fw | −1.41 | −1.42 | −1.41 | −1.35 |
| f2/fw | 2.01 | 2.01 | 1.96 | 2.14 |
| f3/fw | 12.11 | 14.34 | 10.38 | 12.95 |
| f4/fw | 3.64 | 3.38 | 4.23 | 2.70 |
| f5/fw | 21.46 | 33.21 | −42.32 | −28.76 |
| f6/fw | 2.95 | 2.82 | 2.52 | 2.73 |
| L/fw | 6.14 | 6.14 | 5.89 | 5.89 |
| Bfw/fw | 1.33 | 1.32 | 1.23 | 1.25 |
| 2ω | 51.40 | 51.40 | 52.00 | 52.00 |
| (1) f3/f4 | 3.33 | 4.24 | 2.45 | 4.80 |
| (2) (R41f + R41r)/(R41f − R41r) | −1.49 | −1.41 | −2.60 | −1.15 |
| (3) ft/fw | 1.70 | 1.70 | 1.70 | 1.70 |
| (4) Fw | 1.60 | 1.60 | 1.60 | 1.60 |

A through L of FIG. 8 respectively show each of various aberration diagrams of the projection zoom lens of Example 4.

The present invention has been described with reference to the embodiments and Examples. The projection zoom lens of the present invention is not limited to the Examples described above, and various modifications are possible. For example, values, such as the radius of curvature of each lens, the distances between surfaces, the refractive indices, and the Abbe numbers can be varied as appropriate.

Further, the projection type display device of the present invention is also not limited to the configurations described above. For example, the light valves to be employed and optical members used for the beam separation or beam composition are not limited to the above configurations, and various modifications are possible.

What is claimed is:

1. A projection zoom lens, substantially consisting of:
a first lens group having negative refractive power, a second lens group having positive refractive power, a third lens group having positive refractive power, a fourth lens group having positive refractive power, a fifth lens group having positive or negative refractive power, and a sixth lens group having positive refractive power, arranged in this order from the magnification side of the projection zoom lens;
wherein the reduction side is telecentric,
the first lens group and the sixth lens group are fixed and the second lens group through the fifth lens group move along the optical axis while changing magnification,
the fourth lens group substantially consists of only one positive meniscus lens with a concave surface toward the reduction side, and conditional expression (1) below is satisfied:

$$1.2 < f3/f4 < 10.0 \quad (1),$$

where
f3: the focal length of the third lens group, and
f4: the focal length of the fourth lens group, and
conditional expression (2) below is satisfied:

$$-4.0 < (R41f + R41r)/(R41f - R41r) < -0.5 \quad (2),$$

where
R41f: the radius of curvature on the magnification side surface of the meniscus lens, and
R41r: the radius of curvature on the reduction side surface of the meniscus lens, and
all the lens groups which move while changing magnification are configured to move from the reduction side toward the magnification side in the case of changing magnification from the wide angle end to the telephoto end.

2. The projection zoom lens of claim 1, wherein the projection zoom lens satisfies conditional expression (1') below:

$$1.6 < f3/f4 < 6.0 \quad (1').$$

3. The projection zoom lens of claim 1, wherein the projection zoom lens satisfies conditional expression (2') below:

$$-3.5 < (R41f + R41r)/(R41f - R41r) < -0.9 \quad (2').$$

4. The projection zoom lens of claim 1, wherein the third lens group substantially consists of a cemented lens formed by a positive lens and a negative lens.

5. The projection zoom lens of claim 1, wherein the projection zoom lens satisfies conditional expression (3) below:

$$1.5 \leq ft/fw \quad (3),$$

where
fw: the focal length of the entire system at the wide angle end, and
ft: the focal length of the entire system at the telephoto end.

6. The projection zoom lens of claim 5, wherein the projection zoom lens satisfies conditional expression (3') below:

$$1.6 \leq ft/fw \quad (3').$$

7. The projection zoom lens of claim 1, wherein the projection zoom lens satisfies conditional expression (4) below:

$$Fw < 1.9 \quad (4),$$

where
Fw: FNo. at the wide angle end.

8. The projection zoom lens of claim 7, wherein the projection zoom lens satisfies conditional expression (4') below:

$$Fw < 1.7 \quad (4').$$

9. The projection zoom lens of claim 1, wherein the first lens group includes a lens having at least one aspheric surface.

10. The projection zoom lens of claim 1, wherein focusing is performed by moving the entire first lens group in the direction of the optical axis.

11. A projection type display device comprising:
a light source;
a light valve;
an illumination optical section which guides a light beam from the light source to the light valve; and
the projection lens of claim 1,
wherein the light beam from the light source is optically modulated by the light valve and is projected onto a screen by the projection zoom lens.

* * * * *